(12) United States Patent
Fischer et al.

(10) Patent No.: US 6,695,892 B1
(45) Date of Patent: Feb. 24, 2004

(54) ORGANIC FERTILIZER HAVING HUMIC PROPERTIES ITS METHOD OF PRODUCTION AND ITS USE

(75) Inventors: Klaus Fischer, Grillenburg (DE); Rainer Schiene, Tharandt (DE); Joachim Katzur, Luebben (DE)

(73) Assignee: Novihum GmbH, Saalhausen (DE)

( * ) Notice: Subject to any disclaimer, the term of this patent is extended or adjusted under 35 U.S.C. 154(b) by 0 days.

(21) Appl. No.: 09/868,688

(22) PCT Filed: Dec. 17, 1999

(86) PCT No.: PCT/DE99/04029

§ 371 (c)(1),
(2), (4) Date: Mar. 22, 2002

(87) PCT Pub. No.: WO00/37394

PCT Pub. Date: Jun. 29, 2000

(30) Foreign Application Priority Data

Dec. 22, 1998 (DE) .......................... 198 59 068

(51) Int. Cl.[7] ................................. C05F 11/02
(52) U.S. Cl. .................... 71/24; 71/25; 71/32
(58) Field of Search ................ 71/24, 25, 32

(56) References Cited

U.S. PATENT DOCUMENTS

| | | | | |
|---|---|---|---|---|
| 2,027,766 A | * | 1/1936 | Davis et al. ..................... 71/6 |
| 3,111,404 A | * | 11/1963 | Karcher et al. ................. 71/24 |
| 3,325,275 A | * | 6/1967 | Bratzler et al. ................. 71/25 |
| 3,630,710 A | * | 12/1971 | Frederickson ................... 71/23 |
| 3,770,411 A | * | 11/1973 | Chambers et al. .............. 71/24 |
| 4,180,392 A | * | 12/1979 | Ishibashi et al. ............... 71/25 |
| 5,302,524 A | | 4/1994 | Van De Venter et al. ..................... 435/240.54 |
| 5,720,792 A | | 2/1998 | Fischer et al. ................. 71/11 |

FOREIGN PATENT DOCUMENTS

| | | |
|---|---|---|
| DE | 2247938 | 4/1974 |
| EP | 0282250 | 9/1988 |
| SU | 333156 | * 3/1970 |
| SU | 1763437 | * 9/1992 |

* cited by examiner

*Primary Examiner*—C. Sayala
(74) *Attorney, Agent, or Firm*—Jordan and Hamburg LLP

(57) ABSTRACT

The invention concerns a method for the production of an organic fertilizer of humic-like nature, by oxidising and ammoniating treatment of lignite, characterised by the fact that lignite is suspended in a aqueous ammoniacal medium of pH>9 to 12 and in this context is partially dissolved and is oxidised at a temperature of 20–100° C. at normal pressure; and the organic fertilizer being obtained as a dispersion in aqueous medium, by thickening, or by drying, with a C/N ratio from 9 to 15. An organic fertilizer as well as its use is described. The process enables the production of an organic fertilizer from lignite distinguished by a humus-like structure and slow-releasing fertilization effect, and its use as such or as an addition to yield-increasing and soil-ameliorating substrates.

11 Claims, No Drawings

ORGANIC FERTILIZER HAVING HUMIC PROPERTIES ITS METHOD OF PRODUCTION AND ITS USE

The invention concerns a method for the production of an organic fertiliser of humic-like nature according to the generic term of claim 1. The invention refers furthermore to a fertiliser of a special composition as well as its use, produced according to the process. The fertiliser can be used as a close-to-nature material for sustainable plant nutrition and soil improvement.

Owing to its properties and its availability lignite has already for long aroused the interest taken in the production of substances or mixtures of substances being effective as fertilisers.

So from DE 22 47 938 A a process according to the generic term of claim 1 is known. Raw lignite is oxidised and ammoniated in aqueous suspension at increased temperature (80 to 200° C.) and a raised pressure (up to 50 at plus pressure). The suspension contains 95 to 70 per cent by weight water, ammonia is added, heated to conversion temperature in a pressure vessel which then is brought to conversion pressure by injecting pure oxygen. A particular mode of adjustment to a definite pH value is not described.

From the EP 0 298 710 a process is known, according to which coal is processed based on aqueous medium to obtain a suspension of a 4 to 9 pH. The suspension is oxidised by means of a gaseous oxidant such as oxygen, air and mixtures thereof. The oxidation takes place at temperatures from 100 to 300° C. under a pressure of 0.1 to 10 MPa and during a reaction time of 5 to 600 minutes. The oxidised product appears to have a nitrogen proportion just below 2 %. This results in an unfavorable C/N ratio of approximately 35 up to 40.

A procedure to stimulate the growth of seedlings is known from DE 40 15 277 A1, characterised by application of a coal oxidation product to the growing medium of the seedling. A product is suggested as coal oxidation product which is obtained by dry oxidation of the coal with oxygen, particularly air, at a temperature between 120 and 350° C. and an oxygen partial pressure between 0.01 and 1 MPa, preferably between 0.01 and 0.5 MPa, over a time of contact between 15 and 600 minutes. A product is suggested as another coal oxidation product, which is produced according to EP 0 298 710. Typically, the coal oxidation product resulting from dry oxidation is characterised by a nitrogen proportion of less than 2% and a C/N ratio of about 35.

According to U.S. Pat. No. 3,607,212, lignite is mixed with inorganic substances and/or organic bulk waste. If appropriate, these mixtures are subjected to a preliminary mechanical treatment and/or to hydrolytic processes.

Other known papers also refer to the high proportion of coal humic acids contained in lignite and the possibilities of obtaining them. For example, the coal humic acids were extracted according to U.S. Pat. No. 3,770,411, using aqueous ammonia, and the extracts converted by means of phosphoric acid.

A process is known from the U.S. Pat. No. 4,013,440 by which coal is directly treated with urea or urea solutions and the products of which being subsequently oxidised by means of $HNO_3$ and $H_2O_2$, respectively.

In Mukherjee, P.N. et al: Proc. Nat. Acad. Sci. India, Vol. A 38, 1961, Nr. 1, pp. 124–126 the target was pursued to produce, in a direct way from coal, organic-mineral fertilisers with a high nitrogen content (10 . . . 20%). In the process described the conversion of coal by means of ammonia/air/oxygen mixtures is referred to, however in fluid process, at temperatures ranging from 250 to 325° C., by the principle of amoxydation.

Furthermore, from the printed script Güruz; Kemal. Oxy-ammoniation of Elbistan lignite to produce a nitrogenous fertiliser, Fuel, 1980, Vol. 59, pp. 772–776 investigations have became known in which a definite lignite was converted using aqueous ammonia and oxygen at increased pressure in an autoclave at raised temperatures, The oxygen pressure, measured at 25° C. occurred in orders of magnitude ranging from 0.1 to 2.3 MPa. To achieve a high N content, the lignite was pre-treated using mineral acids. The product generated in this way has a total nitrogen content of 8.8 to 18%, with up to 64%o being available as water-soluble proportions in the form of ammonium. This fertiliser may be assessed as a pure nitrogen fertiliser characterised by a high proportion of ammonium.

Yet another process for producing an organic fertiliser by oxidative ammonolysis of technical lignin is known from EP 0 689 526 B 1, with lignin being isolated by precipitation from waste liquors of alkaline chemical pulping processes and tom alkaline lignin extractives. A special characteristic of the process is that the precipitation of lignin is completed in the alkaline environment. The organic fertiliser is distinguished by a particularly high proportion of stronger organically bonded nitrogen (55% to 85% of total nitrogen of the fertiliser). The have the process run requires the presence of freely available technical lignin.

The objective of the invention consists in converting, based on application of a process, an organic substance occurring plentifully in nature into an organic fertiliser characterised by pronounced humic properties, an increased nitrogen content, with the C/N ratio being favorable and a slow-release fertilising effect.

Pertaining to the Invention this objective is implemented in that lignite is suspended in an aqueous ammoniacal milieu of pH>9 up to 12 and in this connection is partially dissolved and in aqueous ammoniacal medium oxidised at a temperature from 20° C. to 100° C. under normal pressure; and the organic fertiliser is obtained as a dispersion in aqueous medium, by thickening, or drying with the C/N ratio being between 9 to 15.

The peculiarity of the process is that the lignite in terms of a mixture of an aqueous suspension and solution in alkaline medium is mildly oxidised in the presence of a N-basic reactant like, in particular, ammonia.

In an advantageous variant of the process, lignite is at first transferred into an aqueous-ammoniacal mixture of suspension and solution, and in the following activated in alkaline medium in a reactor being designed by the injector principle, for the time being without any supply of oxygen/air, anti in this connection heated to the oxidation temperature during a time period adjustable to up to 0.5 h. So as to obtain a mild, however effective oxidation already at a relatively low reaction temperature of far below 100° C., the next step consists in charging the oxidising gas into the reaction mixture via the injector. This process results in the emergence of a system consisting of liquid and fine-bubbly foam being characterised by a large exchange area between the organic substance in the liquid and the oxidising gas. This enables to bring about the effective oxidation both by oxygen and also by air and in the latter case at a remarkably lower oxygen partial pressure of far below 0.1 MPa as compared with the application of pure oxygen.

When the given time of reaction has elapsed, the oxygen input is switched off and the reaction is stopped. This is followed by the cooling down of the reaction mixture without further oxygen supply to a temperature which is required for a processing. In this context, the special reactor advantageously facilitates the cooling down periods to last for as short a period as <1 h.

The oxidation can be carried out in the presence of air or oxygen, or air/oxygen mixtures and in an aqueous-ammoniacal medium at an ammonia concentration of up to 7%. Lignite of various particle sizes can be used.

Advantageously the oxidation is run at a reaction temperature of up to 100° C. and over a time period of 0.5 to 4 hours.

Corresponding to the special execution of the process, use is made of the starting material lignite in a mixture with technical lignins from pulp making industry as well as from wood hydrolysis, lignite in a mixture with lignin as well as lignocellulose material from the Steam Explosion pulping used in the manufacture of fibrous materials, as well as lignite in a mixture with lignocellulose material such as wood or bark particles.

Another advantageous execution of the process envisages that subsequent to the oxidation of lignite or of lignite in a mixture with lignins another addition with macro and micro nutrients such as phosphorus is performed.

An organic fertiliser obtained from this process is characterised by the features named in claim 8. The fertiliser pertaining to the invention is distinguished by a C/N ratio from 9 to 15, with the nitrogen occurring in different forms of bond.

The use of the organic fertiliser is described by the features named in claim 10.

Surprisingly, in this process lignite, although containing a high proportion of structures of the coal-specific kind of humic and fulvic acids which are a highly condensed, suspended or partially dissolved in an aqueous ammoniacal medium by oxidation is convertible into a humus-like fertiliser characterised by a slow-release effect. In the process pertaining to the invention nitrogen in chemically bonded form is introduced into the coal humic substances, causing the chemical structure of the coal humic substances to change into a form greatly resembling the humic substances typical of soil emerging, under natural conditions. At the same time, the high-molecular organic structures of the coal which are not similar to humic substances are partially decomposed, i.e. broken down into smaller molecular sizes, and modified by polar groups.

The process can be technologically implemented by keeping the aqueous ammoniacal mixture of suspension and solution of the starting material in circulation via a heat exchanger, whilst charging the oxidising gas via an injector system.

Compared with previous solutions, this process comprises a number of advantages. It is distinguished by the fact that lignite as starting material, is converted as a whole without preceding separating operations and the humic substitute produced in the conversion can equally be utilised as a whole product without requiring additional separation processes.

Oxygen or air alone may serve as oxidant. In contrast to all previously described processes of an oxidation of this kind by means of oxygen or air, the oxidant is advantageously applied, pertaining to the invention, under mild conditions at normal pressure and at temperatures of up to 100° C.

The products made from lignite by this process may contain as much as 6% of total nitrogen occurring in diverse types of chemical bond which differ by their hydrolyzability. The nitrogen bonded in terms of ammonium (20–45% of total nitrogen), can by means of MgO suspended in water readily be cleaved off in term of ammonia, whereas the organic kinds of bond (55–80% of total nitrogen) are not readily hydrolyzable. A part of the organically bonded nitrogen occurs in terms of amide (up to 20% of total nitrogen) which hydrolyse in the normal manner by means of diluted sodium hydroxide solution under the conditions of steam distillation. That portion which is non-hydrolyzable under these experimental conditions is designated as stronger organically bonded nitrogen (up to 60% of total nitrogen), These various kinds of bond of nitrogen together with the organic matrix cause the plants to be provided with nitrogen in a lasting and slow release manner. This goes along with a remarkable reduction in nitrogen leaching to seepage and ground-water.

As a whole, the elementary-analytical data of the products reveal the favorable and desired modifications of the starting material, which are achieved by this process.

The high C/N ratio of 93 of the starting lignite could be decreased to the value of 9–15 a value being advantageous for the application.

There is an increase of the atomic H/C ratio from 1.05 to 1.28, While in the coal humic acids approx. 1–1.5% of N appear to be organically bonded, this proportion in the humic substitutes accounts for up to 4%, which is similar to the humic acids of the soil which forming under natural conditions.

The process pertaining to the invention enables lignite from various sites (origin) to be used as starting material.

It is a particular advantage of the process that mixtures of lignite with technical lignins from pulp-making as well as wood hydrolysis, of lignite with lignin as well as lignocellulose material from the Steam Explosion pulping for the production of fibrous material, and from lignite with lignocellulose material such as wood and bark particles, respectively, can likewise be used as starting material.

By application of the above mentioned mixtures, product properties are attainable which facilitate effective special applications like e.g. the prevention of erosion. Moreover, the process pertaining to the invention is characterised by the possibility to also add to the product macro and micro nutrients such as phosphorus.

Subsequently, the invention will be described in closer detail by examples.

EXAMPLE 1

30–70 g of lignite of a particle size within the range of <1.0 mm, preferably <0.4 mm, were suspended in 200–300 ml of ammonia by thorough mixing and, in this context, partly dissolved. Now this mixture consisting of suspension and solution was filled in a reactor, while adding 3000–3500 ml of ammonia.

In a second variant, this mixture of suspension and solution was pre-treated by allowing it to stand for several hours with occasional shaking and intermixing. This is followed by the process corresponding to variant 1.

Subsequently, the mixture is circulated via a tube reactor and a heat exchanger, with a reaction temperature being adjusted to 70–76° C. After assuming the given reaction temperature, oxygen is charged at a rate of 30–50 L/h via an injection system and the beginning oxidative ammonolysis takes place under continuous circulation and a steady supply of the oxidising gas over a reaction period from 1 to 4 hours.

When the reaction is completed, the oxygen supply is switched off, the reaction mixture cooled down by circulation, and subsequently discharged. Finally, following evaporation or vacuum evaporation, respectively, the reaction product is obtained in terms of a solid. The nitrogen yield was determined analytically.

Elementary Analysis:

| | |
|---|---|
| C | 53.50% |
| H | 5.32% |
| N | 5.97% |
| S | 0.45% |

Types of bond of nitrogen (in % of total nitrogen content):

| | |
|---|---|
| ammonium-N | 32.8% |
| organically bonded | 67.2% |
| amide-N | 11.1% |
| stronger organically bonded | 56.1% |

EXAMPLE 2

The conversion takes place like in Example 1, variant 1 or 2. Instead of oxygen, however, air is charged as oxidising gas at a rate of 50 L/h. The nitrogen yield was analytically determined.

Elementary Analysis:

| | |
|---|---|
| C | 57.03% |
| H | 5.15% |
| N | 5.56% |
| S | 0.58% |

Types of bond of nitrogen (in % of total nitrogen content):

| | |
|---|---|
| ammonium-N | 34.6% |
| organically bonded | 65.4% |
| amide-N | 14.0% |
| stronger organically bonded | 51.4% |

EXAMPLE 3

35 g of lignite of particle sizes within the range <1.0, preferably <0.4 mm, were suspended in 200 ml of ammonia by thorough intermixing, and partly dissolved, and 35 g of alkali lignin dissolved in 200 ml of ammonia. The mixture consisting of coal suspension and solution and the lignin solution were put together and further processed either immediately as described in Example 1, variant 1, or subsequent to a pre-treatment as described in Example 1, variant 2. This was followed by filling this whole mixture in the reactor, while adding 3000 to 3500 ml of ammonia.

Subsequently, the mixture was circulated via a tube reactor and a heat exchanger and adjusted to the reaction temperature of 70–76° C.

The nitrogen yield was determined analytically.

Elementary Analysis:

| | |
|---|---|
| C | 55.92% |
| H | 5.46% |
| N | 5.56% |
| S | 0.86% |

Types of bond of nitrogen (in % of total nitrogen content):

| | |
|---|---|
| ammonium-N | 35.3% |
| organically bonded | 64.7% |
| amide-N | 11.5% |
| stronger organically bonded | 53.2% |

EXAMPLE 4

35 g of lignite of the particle sizes within the range of <1.0, preferably <0.4 mm, were suspended in 200 ml of ammonia by thorough intermixing and partly dissolved, and 35 g of dry powdery sulphite spent liquor were dissolved in 200 ml of ammonia The mixture consisting of coal suspension and solution and the lignin solution were mixed and further processed either immediately as described in Example 1, variant 1, or subsequently to a pre-treatment as described in Example 1, variant 2.

Next, the whole mixture was filled in the reactor, while adding 3000–3500 ml of ammonia This was succeeded by circulating the mixture via a tube reactor and a heat exchanger and adjusting the reaction temperature to 70–76° C.

The nitrogen yield w analytically determined.

Elementary Analysis:

| | |
|---|---|
| C | 45.97% |
| H | 4.94% |
| N | 4.65% |
| S | 3.86% |

Types of bond of nitrogen (in % of total nitrogen content):

| | |
|---|---|
| ammonium-N | 35.9% |
| organically bonded | 64.1% |
| amide-N | 14.6% |
| stronger organically bonded | 49.5% |

EXAMPLE 5

The conversion was performed as in Example 4. Instead of oxygen, however, air was charged as oxidising gas at a rate of 50 L/h.

The nitrogen yield was analytically determined.

Elementary Analysis:

| | |
|---|---|
| C | 49.77% |
| H | 4.73% |
| N | 3.34 |
| S | 3.55% |

Types of bond of nitrogen (in % of total nitrogen content):

| | |
|---|---|
| ammonium-N | 31.1% |
| organically bonded | 68.9% |
| amide-N | 13.8% |
| stronger organically bonded | 55.1% |

What is claimed is:

1. A method for the production of organic fertilizer having humic properties, comprising suspending lignite in an aqueous-ammoniacal medium of pH greater than about 9 and up to about 12, dissolving partially and oxidizing the lignite at a temperature of about 20 to about 100° C. under atmospheric pressure thereby to obtain the organic fertilizer as a dispersion in aqueous medium and thickening or drying the dispersion, the organic fertilizer having a C/N ratio of about 9 to about 15.

2. The method according to claim 1, wherein the aqueous-ammoniacal medium is a mixture of a suspension and a solution, the mixture containing the lignite is introduced into a reactor and, without the supplying of air or oxygen to the reactor, is activated in alkaline medium and within a period of up to about 0.5 hour is heated to an oxidation temperature of below 100° C. whereupon oxidizing gas comprising air or oxygen or mixtures thereof is injected into the mixture, the oxidizing gas being at atmospheric pressure and the mixtures of air and oxygen having oxygen partial pressures of about 0.02 to less than 0.1 MPa, terminating the injection of the oxidizing gas and cooling the mixture.

3. The method according to claim 1 or 2, in which the oxidation is effected by contacting the lignite with air or oxygen or a mixture of air and oxygen and the ammonia concentration of the aqueous ammoniacal medium is up to about 7%.

4. The method of claim 1 or 2, wherein the lignite is particulate.

5. The method of claim 1 or 2, wherein the oxidizing is effected over a period of about 0.25 to about 4 hours.

6. The method of claim 1 or 2, wherein the lignite is in admixture with at least one substance selected from the group consisting of lignins from pulp-making, lignins from wood hydrolysis, lignocellulose from steam explosion pulping for the production of fibrous materials, wood particles and bark particles.

7. The method of claim 1 or 2, further comprising a step of adding a macro or micro nutrient thereby to incorporate the nutrient in the fertilizer.

8. The method of claim 7, wherein the nutrient is phosphorous.

9. An organic fertilizer having humic properties prepared by the method of claim 1 or 2, having a C/N ratio of about 9 to about 15 wherein various proportions of the nitrogen are chemically bonded as follows, 20–45% as ammonium nitrogen and 55–80% organically bonded, of said organically bonded nitrogen, up to 20% being organically bonded as amide, and up to 80% being organically bonded more strongly than amide.

10. The organic fertilizer according to claim 9, wherein the nitrogen content is up to about 6%.

11. A method of improving the crop yield and quality of soil, comprising applying the fertilizer of claim 9 thereto.

* * * * *